Feb. 15, 1938.　　　H. V. DUNHAM　　　2,108,582
CASEIN PRODUCT AND PROCESS OF MAKING
Filed April 26, 1935
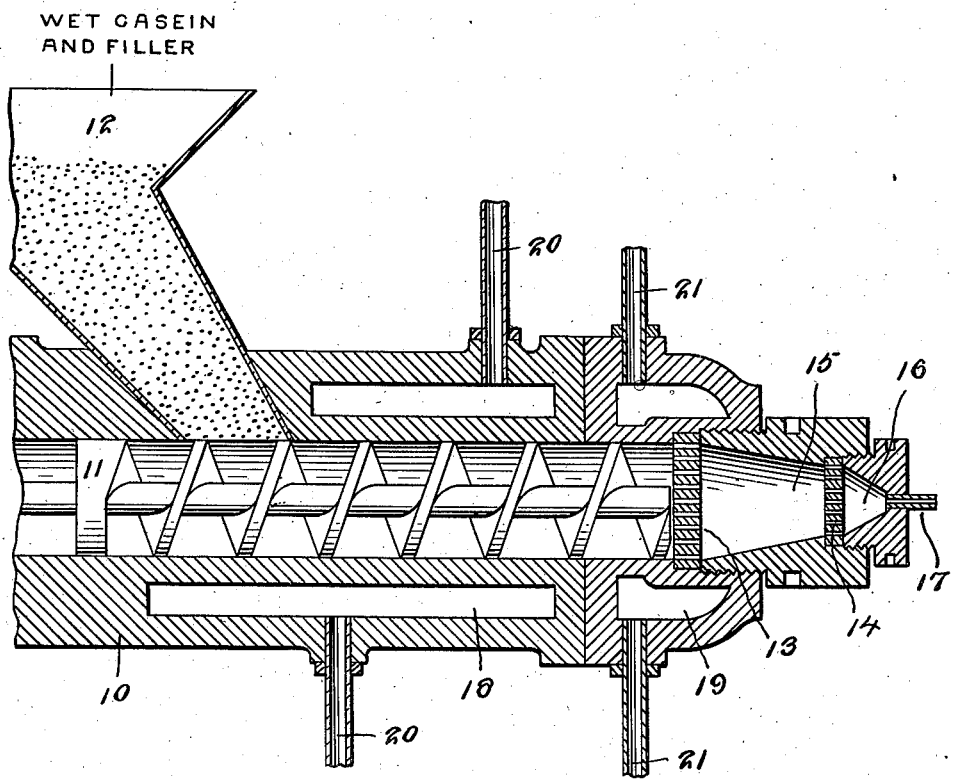

Patented Feb. 15, 1938

2,108,582

UNITED STATES PATENT OFFICE 2,108,582

CASEIN PRODUCT AND PROCESS OF MAKING

Henry V. Dunham, Bainbridge, N. Y.

Application April 26, 1935, Serial No. 18,436
In Great Britain December 8, 1934

12 Claims. (Cl. 134—23.9)

The present invention relates to the manufacture of products, from "acid precipitated" casein, and the invention is an extension of and modification of the process covered in my copending application Serial No. 644,752, filed November 22, 1932 (now Patent 2,005,730), of which the present case is in part a continuation and further development.

In accordance with the present invention I produce very intimate mixtures of casein and extending materials, fillers, softening agents, modifying agents, or the like, one or several (all hereinafter embraced under the generic term "fillers" for brevity), by treating moist casein and the said added substances, in a screw press or the like, said screw press being, if desired, supplied with a heating and/or cooling jacket. During this operation the materials are very thoroughly blended together, under high pressure, and within the outlet end of the screw press there is preferably provided one or more perforated plates or grids or screens, and the mixture is extruded from the said screw press preferably in the form of a thin ribbon (a form having at least one very small dimension) and the extruded material is thereafter preferably dried and ground. The mixture which is to be treated in the said screw press may be dried casein to which a fraction of its own weight of water has been added, and the casein allowed to absorb this water, then the extending material or other filler, etc., is added, preferably (in most cases) in a dry condition, the components mixed together, and the mixture introduced at the inlet of the extruding machine.

The annexed drawing illustrates conventionally an apparatus of well known construction suitable for carrying out the kneading and extruding operations, this apparatus being such as has long been used in the industry of casein plastics. Rennet casein, is commonly used in plastics, but in the present invention I use acid-precipitated casein exclusively.

Within the casing 10 is mounted a rotating screw 11, which forces the material towards the right in the drawing. The mixture comprising wet casein and filler is introduced through the hopper 12 where it is picked up by the convolutions of the rotating screw 11, and forced under high pressure through the perforated plates shown respectively at 13 and 14, which are perforated with various sized holes. The passage 15 between these two plates may taper somewhat as shown, and the passage 16 leading to the extrusion outlet 17 also tapers. The outlet 17 may be in the form of a slot having one small dimension, for example this may be half an inch wide and a sixteenth of an inch high, to produce a ribbon, or it could have one or more small holes to produce one or several small strings or "worms".

At 18 and 19 are shown suitable jackets for containing heating or cooling fluids, such as steam, hot water, warm water, cold brine or the like. These jackets are provided with suitable inlet and outlet pipes 20 and 21 as well known in the art.

After the material extruded at 17 has been dried, and preferably ground to a coarse or fine powder, it can be mixed with various chemicals to serve as casein solvents for the manufacture of glue, adhesives, sizings, paints, emulsions, or various other final products.

It will be understood that in the convolutions of the screw, as well as in passing through the perforations in plates 13 and 14, and also in passing through the tapering passages 15 and 16, and the extrusion outlet 17, the mixture may be under very high pressure.

As examples of the fillers I mention wood-flour, whiting, clays, pigments, softening agents, waxes, resins, and modifying agents such as dextrine, starch or starchy materials, proteinous substances such as hide glues, animal glues, vegetable seedmeals, such as peanut meal, soymeal and the like, or the isolated proteins from said meals, without in any way restricting myself to these particular substances. Many examples of suitable substances to be added might be given, but the following are mentioned as illustrative of suitable types. Mineral fillers such as barytes, clay, talc, gypsum, lithopone, zinc oxide, titanium white pigments and bentonite as well as all other pigment types, also any or all or a mixture of colors like ochres, iron oxides, sienna, burnt umber, vermilion, lead and zinc pigments, chrome pigments and any other water insoluble or substantially water insoluble pigments ordinarily used in the making of paints.

Also I may include modifying agents of the nature of soaps, e. g. the lineolates, stearates, oleates, resinates, palmitates and other soaps of the metals or non-metals such as sodium, ammonium, potassium, cobalt, copper, calcium, aluminum, zinc, iron, etc., also various waxes and soft balsams such as balsam of fir, bayberry wax, carnauba wax, Montan wax, wool fat, China vegetable wax, Japan wax, and the like. Also water-soluble gums such as gum arabic, gum kino, gum karaya and the like as well as low melting point resins, ester gums, shellac, synthetic resins, softening agents like glycerine, glycol, ethylene glycol, di-ethylene glycol and other polymers, the various starches, glues, dextrines, blood albumen, dried blood.

The materials mentioned in the two preceding paragraphs (and others mentioned in some of the examples given below) will hereinafter be referred to under the generic term "filler".

The proportions of the components can vary between wide limits. Ordinary dry casein may contain about 8 to 11% of moisture. There may be added to this, about 15 to 25% of water, to form the wet casein, which may contain about 23 to 36% of water. An undried casein or partly dried casein of this moisture content could be employed, where available. With the wet casein may be used about 10 to 200%, more or less, of one or more of the above, (or analogous) fillers or mixtures thereof.

I have referred above to first mixing the casein with a small amount of water and allowing this to stand, stirring the mixture at intervals if desired, until the casein has absorbed the water, and then mixing the wet casein with the filler. In other cases the casein, filler and water are simply thrown together into a tumbling barrel or other mixing device, and then fed to the hopper 12.

I give the following examples, for the purpose of illustration, but not as restricting the invention thereto.

Example 1

75 pounds of dry commercial casein in the form of a powder are mixed with 25 pounds of water, and the mass stirred occasionally until the casein has absorbed the said amount of water. Then 25 pounds of finely ground wood flour are added, and the mass roughly mixed. It is then fed into the hopper 12 of the extrusion press, the jackets 18 and 19 being filled with warm water at say 60 to 70° C., and the extruded material is then dried, and ground to a fine powder.

During the mixing and kneading process the casein and wood flour will be found to have been very completely and thoroughly mixed together, into the form of a thoroughly homogeneous mixture. A mixture can be produced which is far more homogeneous than any mixture of these materials produced by the commonly used mixing methods.

The dried and powdered material can thereafter be mixed in an ordinary mixer, with soda, lime, sodium fluoride, borax, trisodium phosphate or mixtures of these materials, in the proportions commonly used in the manufacture of dry casein glue. Subsequently this mixture of the dry products and alkali is mixed with water to form a casein glue or a sizing or a coating composition for applying to paper, as in the production of wall paper. According to the amount of water used, the liquid produced may be a heavy-bodied liquid material with the finely ground wood flour thoroughly suspended in the same in a uniform manner, which can be applied by ordinary glue spreading machines, to veneers for making plywood, or a liquid of thinner consistency which can be applied to paper as a coating.

Example 2

75 parts of dry ground casein, 15 parts of finely powdered dry clay and 20 parts of water. These are mixed, kneaded, extruded and dried as in Example 1.

After drying, the dry, powdered product can be used as a distemper paint, by being mixed with alkali, lime and the like, and the final mixture subsequently dissolved in water. If desired, a much larger amount of the powdered dry clay can be used than indicated above. Coloring pigments or dyes can also be added to the initial material or to the extruded and dried material.

The clay is so uniformly distributed through the mass of casein, when in a softened condition in the screw press that when the dried paint is mixed with water, it will not settle as badly as when the paint is made by the conventional methods.

In a modification of this example, 20 parts of powdered talc can be used in place of the dry clay.

Example 3

|  | Pounds |
|---|---|
| Casein | 75 |
| Dry chrome yellow pigment | 50 |
| Water | 35 |

The above materials are mixed together, and allowed to stand for a time for the water to be absorbed by the casein and dry yellow pigment, or the water and casein can first be mixed together, allowed to stand for the water to be absorbed and the dry pigment then added. The mixture is then passed through the extrusion device as above referred to, the product is dried and ground to a fine powder.

For making an artist's paint this powder can be mixed with sufficient alkaline material in the dry form to act as a solvent for the casein when water is added. The intimate intermingling of the pigment with the casein in the initial process produces a very uniform final liquid product.

A suitable amount of the colored powder, either alone or in admixture with a casein solvent can also be blended with compositions of the type described in Example 2. It is to be understood that instead of the yellow pigment, pigments of various other colors can be similarly employed.

Example 4

|  | Pounds |
|---|---|
| Casein | 75 |
| Finely shredded Japan wax | 10 |
| Water | 20 |

The above mixture is extruded, dried and ground to a fine powder.

When this dry powder is added to a mixture of water and an alkaline material, or when the said dry powder is mixed with alkali and subsequently added to water, the casein will dissolve. There is produced an extremely uniform mixture or emulsion of dissolved casein and a softening agent, namely Japan wax, which emulsion is uniform and relatively stable, and can be used as a coating, where soft flexible coatings of casein or casein mixtures are desired.

It is of course to be understood that pigments, solid fillers or extending agents and the like can be added, for example before or after the extruding operation.

Example 5

|  | Pounds |
|---|---|
| Ground casein | 75 |
| Powdered paraffine wax | 15 |
| Water | 20 |

The treatment is as in Example 4. The dissolved product from this example gives a more or less water-resisting and oil-resisting coating, and while the paraffine wax is not saponified by the action of casein solvents, it is thoroughly emulsified, and the emulsion remains relatively stable over a considerable period.

In this example, powdered stearic acid can be used instead of paraffine wax. The stearic acid may be in part acted upon by the alkali used in dissolving the casein or in case strong alkalies are used, the whole of the stearic acid can be converted into a soap. Any unconverted stearic acid would form a stable emulsion in the casein solution.

Example 6

| | Pounds |
|---|---|
| Casein | 75 |
| Glycerine | 15 |
| Water | 20 |

The above materials are mixed, extruded, dried and comminuted. Sufficient alkali is added to dissolve the casein, and the mixture is added to water. In place of the glycerine, ethylene glycol or diethylene glycol or other glycols can be employed. The glycerine or equivalent material gives more flexibility to the product obtained by applying the casein solution and drying the same, on paper, cloth, artificial leather, leather or the like and also acts to increase the adhesive quality, for example when casein solution is used for uniting glassine paper to paper, cardboard, coated cardboard or the like.

It will be understood that the addition of waxes, fats, glycerine or similar softeners does not preclude the addition of solid insoluble fillers such as above referred to, but the waxy or fatty material or the softener can be used in addition to the said solid fillers or the like.

In the examples in which solid fillers such as wood flour are used, it will be understood that pigments or other coloring agents can also be added if desired.

Example 7

| | Pounds |
|---|---|
| Ground casein | 75 |
| Cassava starch | 20 |
| Water | 20 |

The ingredients are mixed together, extruded, dried and ground. The powdered material is mixed with alkali as a casein solvent, and this mixture subsequently dissolved in water. By this process the starch becomes very thoroughly blended with the casein in the extruding operation, and a very homogeneous product is thereby produced. There may be sufficient alkali present to constitute a solvent or converting agent for the starch, or the liquid may be heated, to break up the starch granules, thereby overcoming the tendency for the starch to separate from the casein, which ordinarily exists when ground casein and ground starch are mechanically mixed together with mild alkali.

Example 8

| | Pounds |
|---|---|
| Ground casein | 75 |
| Water | 20 |
| Dextrine | 12 |

Add the water to the casein, let it stand for 15 or 20 minutes for the water to be absorbed, then add the dry dextrine, let it soften another 20 minutes with mixing if desired. Then mix, extrude, dry and grind. In this manner dextrine can be uniformly distributed through the casein so that on the subsequent addition of a casein-solvent and water a uniform glue or sizing is obtained which has very much less tendency to foam than is the case when dry casein and dry dextrine with the necessary alkali are mixed together and dissolved in water.

Example 9

| | Pounds |
|---|---|
| Ground casein | 75 |
| Ground peanut meal | 25 |
| Water | 20 |

Soak the casein in the water, then add the peanut meal, extrude, dry and grind. Add at least sufficient alkali to dissolve the casein portion when the powder is subsequently added to water. This powder is an intimate blend of the peanut meal and casein, which differs from a simple mechanical mixture of the two, and which on mixing with an alkali and water readily forms a homogeneous fluid without lumping. The material can be used in the production of paints, sizings, glues and the like.

Example 10

| | Pounds |
|---|---|
| Ground casein | 75 |
| Water | 20 |
| Ground soybean meal | 30 |

Remarks same as under Example No. 9.

Example 11

| | Pounds |
|---|---|
| Ground casein | 75 |
| Water | 20 |
| Ground cottonseed meal | 30 |

Remarks same as under Example 9.

Example 12

| | Pounds |
|---|---|
| Ground casein | 75 |
| Water | 20 |
| Locust bean gum | 10 |

The water is added to the ground casein. The mass is mixed for 15 to 20 minutes, then the dry locust bean gum is sprinkled into the mixture and the mixing is continued for a few minutes. The mass is then extruded, dried, ground and at least sufficient alkaline material added to dissolve the casein portion of the mixture when the mixture is added to water. In this manner, one can get a very uniform distribution of the water-soluble locust bean gum throughout the casein mass. Locust bean gum is useful as a sizing in the textile industry. Casein is also used largely in the textile industry and this combination gives a product which dissolves quickly and uniformly without lumping and produces a desirable sizing for cloth.

Example 13

| | Pounds |
|---|---|
| Casein | 75 |
| Water | 20 |
| Hide glue, finely ground | 15 |

Add the water to the casein, mix 15 or 20 minutes, sift the powdered hide glue into the wetted casein, mix 15 or 20 minutes, extrude, dry, grind and add sufficient casein solvent (e. g. NaHCO$_3$ or borax) to dissolve the casein portion of the mixture when the same is subsequently added to water. In this example a uniform mixture of casein and hide glue is obtained in a dry form, which can be finely pulverized and which then mixes readily with water in the presence of sufficient alkali to dissolve the casein and which produces under proper conditions a more tacky adhesive and will give a more uniform solution than it is possible to obtain when ground hide glue and ground casein and the alkaline material (solvent for the casein) are mixed together in the dry form, and added to water.

Example 14

| | Parts |
|---|---|
| Ground casein | 50 |
| Clay | 20 |
| Glycerine | 10 |
| Cassava starch | 10 |
| Animal glue | 10 |
| Water | 20 |

The casein, clay and starch are mixed together dry; the glycerine is added to the water and the water-glycerine mixture added to the dry mix in the usual way. Mix about 15 minutes then add the dry ground animal glue, mix 10 minutes. Or the casein first may be added to the water, allowed to stand until the water is absorbed and the other components added. However mixed, the mass is extruded, dried, ground to a powder, and the desired amount of alkaline materials added, the amount being at least sufficient to dissolve or substantially dissolve the casein stated in this example.

Of course the proportions given in these various examples are only by way of illustration and greater or less quantities of the several ingredients can be substituted for the examples given in every case.

One advantage of the present process is the production of extremely intimate mixtures with casein. The grade of casein used in the present process is preferably that which is commonly used for making glues and the like, namely casein obtained by precipitation with mineral or organic acids. As is well known, rennet casein is unsuitable for making glues and sizings and is not used in the present invention. It is to be understood that the present invention does not relate to the production of casein plastics, even though the material is in a plastic condition at the time of extrusion through the press illustrated in the drawing. In all cases the dried and comminuted product will be subsequently treated with a casein solvent (e. g. water and alkali) which step ordinarily will be performed in making up the final liquid product. The extruded mass is in all cases disintegrated, e. g. by comminuting, dissolving or the like. And the casein in the final product is soluble in ordinary casein solvents, e. g. soda, borax, ammonia, etc. all in dilute condition.

In the extruding operation I prefer to use a nozzle having a narrow rectangular slot from which the product emerges in the form of a ribbon, or a plurality of small holes, whereby the subsequent-crushing operation is facilitated but the product may also be extruded in the form of slender rods like wires or thin-walled tubes which likewise can be readily broken and reduced to a powder.

The term "dry casein" as used throughout this specification refers to the commercially dried material which ordinarily contains 6 to 10% of moisture. The use of casein dried to this point however is not essential, and for some purposes the initial drying of the casein may be stopped when the casein contains a larger amount of water, say 15 to 20%, and in such cases proportionally less water is added to the initial mix.

The amount of water added to the casein is always less than the amount of the said casein, and is preferably about one-quarter to one-half of the amount of actual casein.

While casein precipitated by mineral acids (or sometimes organic acids) is used in the process of the present case, it is called to attention that in the art of casein plastics, rennet casein is practically universally employed.

Reference was made above to drying the extruded substance, grinding or crushing the same and then adding an alkaline material preferably a mild alkali, to react with the casein in the presence of water to be subsequently added, to form a solution of alkali-casein. The alkali if dry, can of course be added before the grinding or simultaneously therewith or an alkali can be added to the water before incorporating the powdered extruded material therewith.

The vegetable seedmeal described above, such as peanut meal, soybean meal and the like, may be the materials obtained by grinding the press cake remaining after expressing the oil from the respective seeds, this material still containing some oil, or the residue which remains after the oil has been completely extracted with solvents. This constitutes a "modifying agent", as described above.

While I have referred to and illustrated a particular form of apparatus, namely a screw press extruding device, it is to be understood that various other forms of mixing, kneading and extruding devices can be employed for carrying out these steps. Or other forms of apparatus can be used in which the materials are kneaded, mixed or ground together or otherwise incorporated homogeneously with each other, these steps being preferably carried out while the material is being subjected to pressure.

It may in some cases be possible to omit the drying and comminuting step, e. g. where the extruded material (say ribbon) is run directly into an alkaline solution to dissolve the casein content and/or other alkali-soluble constituents present.

Instead of drying the ribbon and then comminuting the dry product, it may be feasible in some cases, to comminute the ribbon, and to then dry the comminuted material, followed, if desired, by further grinding.

I claim:—

1. A process of making a liquid aqueous composition containing dissolved casein, which comprises the step of mixing and kneading together, acid-precipitated casein containing water in amount sufficient to wet the same, the amount of said water being less than the amount of said casein, and an insoluble filler, in the absence of substances capable of acting as solubilizing agents for said casein, and the absence of substances capable of chemically hardening said casein, such kneading step being under substantial superatmospheric pressure, and continuing said operation until a complete admixture of said wet casein and filler is obtained, extruding said mixture, and drying the same, and comminuting the dried product.

2. A process of making a liquid aqueous composition containing dissolved casein, which comprises mixing and kneading together, acid-precipitated casein containing water in amount sufficient to wet the same, the amount of said water being less than the amount of said casein, and a filler which does not chemically combine with said casein, such kneading step being under substantial superatmospheric pressure, and continuing said operation until a complete admixture of the wet casein and filler is obtained, extruding the mixture, and drying the same, said operations being conducted in the absence of solubilizing agents for said casein, and in the absence of hardening agents therefor, and thereafter mixing said dried product with water in the presence of a solubilizing agent for said casein.

3. A process of producing a liquid coating composition which comprises mixing and kneading together, acid-precipitated casein containing water in amount sufficient to wet the same, the amount of water being less than the amount of casein, and a comminuted cellulosic material, such kneading step being under substantial superatmospheric pressure, and continuing said operation until a complete admixture of the wet casein and cellulosic material is obtained, extruding said mixture, and drying the same, and thereafter mixing said dried product with water and such an amount of an alkali as is capable of rendering the casein soluble in water.

4. A process which comprises intimately mixing and kneading together, under superatmospheric pressure, 75 parts of acid-precipitated casein in the presence of about 10 to 40 parts of water, with about 10 to 150 parts of a filler, continuing the mixing and kneading operation until the materials are completely intermixed and extruding the mass and thereafter mixing the product with an alkali and water, whereby the casein dissolves to afford a liquid casein composition.

5. In the manufacture of liquid compositions containing dissolved casein, the herein described steps of mixing moist acid-precipitated casein in which the amount of water is only a minor fraction of the amount of actual casein, with a filler, in the absence of added alkali, and thereafter kneading and extruding the mixture as a product having at least one small dimension, and thereafter drying the extruded material whereby subsequent comminuting of the extruded material is facilitated, grinding the same and admixing same with a reagent which, in the presence of water, will constitute a casein solvent.

6. An intimate mixture of acid-precipitated casein and a filler, kneaded together under pressure, extruded and dried.

7. A product as in claim 6, comminuted and mixed with an alkali.

8. As a new product, a thoroughly kneaded and substantially homogeneous extruded mixture of acid-precipitated casein with a filler, such kneading and extrusion being performed in the absence of chemicals capable of acting as casein solvents and in the absence of chemicals capable of hardening the casein, such extruded product being comminuted and the casein therein being rapidly soluble in alkali solutions.

9. As a new product, a thoroughly kneaded and substantially homogeneous extruded mixture of acid-precipitated casein with a filler said mixture being extruded in the absence of chemicals capable of reacting on casein, and in the absence of reaction products of casein with solubilizing agents or hardening agents, the casein in said product being rapidly soluble in alkali solution.

10. A process of producing a liquid casein composition which comprises mixing and kneading together, acid-precipitated casein containing about 20 to 35% of moisture and a filler extruding the well kneaded material and thereafter converting the product into a liquid state by mixing the same with an alkali water.

11. As a new product, a thoroughly kneaded and substantially homogeneous extruded mixture consisting substantially of acid-precipitated casein, a filler, and a small proportion of water.

12. A process of making a casein product for use in liquid coating compositions and in which the casein will dissolve rapidly in alkali solution but not in water, comprising intimately mixing and kneading together under pressure a mixture comprising 75 parts of acid-precipitated casein, about 10 to 40 parts of water, and about 10 to 150 parts of a non-alkaline filler, continuing the mixing and kneading to increase the rate of solubility of the casein, and extruding the mixture in the absence of chemicals capable of acting as hardening agents for casein and in the absence of chemicals capable of acting as solubilizing agents for casein, and comminuting the extruded product.

HENRY V. DUNHAM.